United States Patent [19]

Hölter et al.

[11] Patent Number: 4,744,289
[45] Date of Patent: May 17, 1988

[54] CAB FOR OCCUPANCY BY INDIVIDUALS

[75] Inventors: Heinz Hölter, Beisenstr. 39-41, D-4390 Gladbeck, Fed. Rep. of Germany; Heinrich Igelbüscher, Gladbeck, Fed. Rep. of Germany; Heinrich Gresch, Dortmund-Wickede, Fed. Rep. of Germany; Heribert Dewert, Gladbeck, Fed. Rep. of Germany; Joachim Tischendorf, Aachen, Fed. Rep. of Germany

[73] Assignee: Heinz Hölter, Gladbeck, Fed. Rep. of Germany

[21] Appl. No.: 929,853

[22] PCT Filed: Feb. 1, 1986

[86] PCT No.: PCT/EP86/00050
§ 371 Date: Oct. 1, 1986
§ 102(e) Date: Oct. 1, 1986

[87] PCT Pub. No.: WO86/04553
PCT Pub. Date: Aug. 14, 1986

[30] Foreign Application Priority Data

| Feb. 5, 1985 | [DE] | Fed. Rep. of Germany | 3503780 |
| Feb. 7, 1985 | [DE] | Fed. Rep. of Germany | 3504155 |
| Feb. 7, 1985 | [DE] | Fed. Rep. of Germany | 3504156 |
| Mar. 8, 1985 | [DE] | Fed. Rep. of Germany | 3508213 |
| Mar. 15, 1985 | [DE] | Fed. Rep. of Germany | 3509369 |

[51] Int. Cl.⁴ .................... B60S 1/54; B60H 3/06
[52] U.S. Cl. ............................ 98/2.01; 98/2.09; 98/2.11

[58] Field of Search ............... 98/2.01, 2.09, 2.11; 55/316; 219/203

[56] References Cited

U.S. PATENT DOCUMENTS

| 2,675,094 | 4/1954 | Young. | |
| 3,870,495 | 3/1975 | Dixson et al. | 98/2.11 X |
| 4,492,151 | 1/1985 | Mattei | 98/2.11 |

FOREIGN PATENT DOCUMENTS

| 2063764 | 7/1972 | Fed. Rep. of Germany | 98/2.11 |
| 7809822 | 8/1978 | Fed. Rep. of Germany. | |
| 2911428 | 10/1980 | Fed. Rep. of Germany. | |
| 1224161 | 6/1960 | France. | |
| 2552728 | 4/1985 | France | 98/2.11 |
| 55-106813 | 8/1980 | Japan. | |
| 57-139233 | 8/1982 | Japan | 98/2.11 |
| 58-174019 | 1/1984 | Japan. | |
| 884967 | 12/1961 | United Kingdom. | |

*Primary Examiner*—Harold Joyce
*Attorney, Agent, or Firm*—Karl F. Ross; Herbert Dubno

[57] ABSTRACT

A cab which serves the occupancy of individuals, preferably in motor vehicles, which is equipped with an aerating and air removal system with integrated blower as well as a filter arrangement. The filter arrangement (3) consists of two filter packages (4, 5) which are arranged in shape of a V, and in whose entrance opening a blower (2) is emplaced, whose sensor (11) is provided on the interior surface of a cab window (12), which upon appearance of moisture on the interior surface of the window furnishes a control pulse.

4 Claims, 2 Drawing Sheets

CAB FOR OCCUPANCY BY INDIVIDUALS

CROSS REFERENCE TO RELATED APPLICATIONS

This application is a National Phase application corresponding to PCT/EP86/00050 filed Feb. 5, 1986 and based under the International Convention upon German National applications P 35 03 780.6 of Feb. 5, 1985 and P 35 04 155.2 and 35 04 156.0, both filed Feb. 7, 1985.

FIELD OF THE INVENTION

The invention relates to a cab for occupancy by individuals, e.g. for a motor vehicle, which is equipped with an aeration and air removal system with integral blower as well as a filtering arrangement.

BACKGROUND OF THE INVENTION

It is known to protect working cabs or the cabs of motor vehicles against external influences with dust filters or also chemical absorption filters so that the occupants of the cabs are not troubled by the noxious substances present in the air brought in for ventilating purposes. The filters of this type are fabric filters or activated charcoal.

The known aeration and air removal system of the abovementioned type are disadvantageous in that, in a comparatively short time they are clogged by pollutants and in that the window areas of such cabs are easily covered by condensation.

OBJECT OF THE INVENTION

The object of the invention is to provide a cab of the abovementioned type such that, the abovementioned disadvantage is avoided and an unobjectionable aeration and air removal with ambient air freed of noxious substances is assured over a period of considerable duration and such that window areas are kept free from condensation.

SUMMARY OF THE INVENTION

In the sense of the invention, this is accomplished in that the filtering arrangement consists of two filter packages, which are arranged in a V, and in whose entrance opening a ventilator is provided, whereby a sensor is provided on the interior of the cab window, and generates a control pulse upon appearance of humidity on the interior surface of the window.

The V-shaped arrangement of the filter packages with respect to each other results in their being saturated uniformly, so that one-sided clogging and resultant premature obstruction of the filter packages is excluded. The sensor measures the moisture condensing on the inside of the window and generates a control pulse for the operation of levers or controls when a certain predetermined value is exceeded.

Advantageously, the filter packages have a chemical absorption arrangement in three layers, where the first layer consists preferably of soda lime, the second of fluffed-up calcium aluminum silcate which is saturated with substances oxidizable with $H_2S$, and the third layer of activated charcoal.

The chemical absorption layers can be provided in a different sequence, depending on whether they are intended for use in rural and/or urban environments, e.g. when $H_2S$ loading dominates, provided with a layer of activated charcoal as the first layer exposed, and/or a mixture of the chemical absorption substances can be provided as a compact filter fill.

For an aeration and air removal system with air conditioning it is advantageous to control the latter not only, as has been usual up to now, depending on outside temperature, but also based on the condensation state of the window panes. For this purpose, a sensor is placed preferrably on the inside of the front pane, so that the latter is freed of the humidity upon appearance of condensation by the start-up of the air conditioning.

Upon response of the sensor the blower of the ventilating system is switched on via the air conditioning machinery and the air nozzles which keep the panes clear receive air, so that the time necessary to free the panes of condensation is shortened further.

In accordance with a further characteristic of the invention, the sensor has an electrically non-conducting carrier foil into which electrically conducting wires are emplaced, the free ends of the wires facing one another being angled out to protrude from an interior surface of the carrier foil, while the other ends are connected to an electrical circuit for measurement of resistance. The electrically conducting wires consist of a corrosion resistant material, so that a long life of the sensor is assured. In the presence of a dry surface the space between the two free wire ends has a very high electrical resistance, which however decreases very significantly as soon as steam condenses on the surface of the carrier foil. This change in resistance is utilized by an electric circuit for measurement of resistance, so that a control pulse is generated, for the actuation of an air conditioning plant and/or a blower.

In accordance with a further feature of the invention, the sensor also provides a color change from greater blue via yellow to red in the presence of noxious substances in the air, so that by the coloring of the indicator element of the sensor in the green or blue one can one can assume that there are no noxious substances in the entering air. By change of color towards yellow or even red, there is an indication that noxious substances are entering, so that it is necessary to ventilate by hand, or that a filter, air conditioning, or the like, should be activated.

SPECIFIC DESCRIPTION

Figure 1:
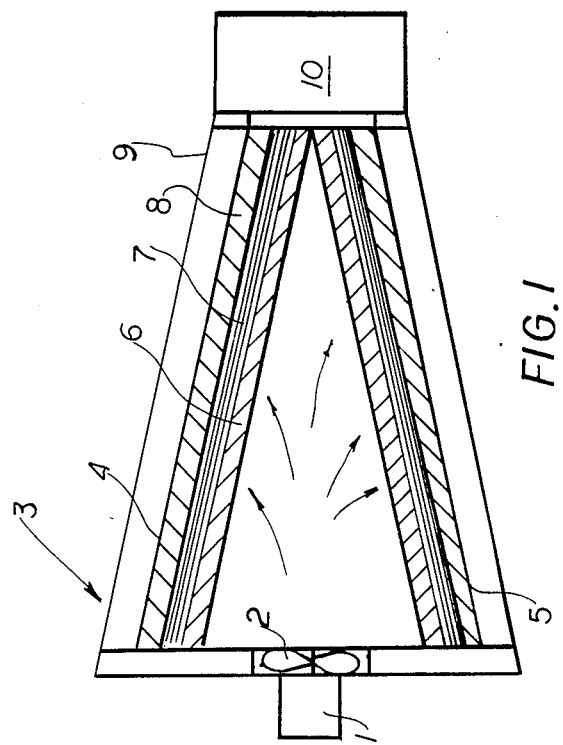
FIG. 1 is a sectional side view of a filter arrangement for the invention.

In FIG. 1, an intake fitting 1 for the air to be cleaned is provided adjacent the suction side of a blower 2. The blower 2 is located in the intake opening of the filter arrangement 3, which is formed by the two filter packages 4, 5 arranged in V-shape.

The two filter packages 4, 5 represent chemical absorption filters which consist of several layers. Layer 6 designates is a layer of soda lime and/or sodium carbonate for the elimination of $NO_2$, layer 7 the layer of puffed-up (expanded) calcium-aluminum-silicate impregnated with a substance for the oxidation of odoriferous substances, such as $H_2S$ with an iron-II-solution, and layer 8 is a layer of activated charcoal.

The housing 9 of the filter arrangement has an outlet fitting 10.

By means of this implementation of the filter device even heavy substances which annoy the sense of smell are eliminated, especially in agricultural vehicles, e.g. while distributing liquid manure, so that the driver's cab is freed of noxious substances. But even the driver of a normal motor vehicle has thus a filter at his disposal, which can compactly placed to the trunk or under the seats, where due to the wedge-shaped arrangement of the filter packages, in addition to the elimination of noxious substances, the noises originating in the blower can be strongly reduced.

The filter packages block hydrogen compounds, particularly hydrogen sulphide and carbon-hydrogen compounds as well as $NO_2$ compounds which endanger humans. The $NO_2$ compounds which act upon the respiratory tract of sensitive people very strongly, and odoriferous and irritant substances and also carcinogenic substances such as carbon-hydrogen compounds, benzpyrene etc. in combination or cumulatively with inorganic substances such as $SO_2$, $NO_2$ and dust, are kept away from humans by the filter. Due to the wedge shape, the exposed area of the filter packages in the direction of flow is reduced, so that the filter packages and their layers are acted upon uniformly, which results in long service life of the filter arrangements.

Figure 2:
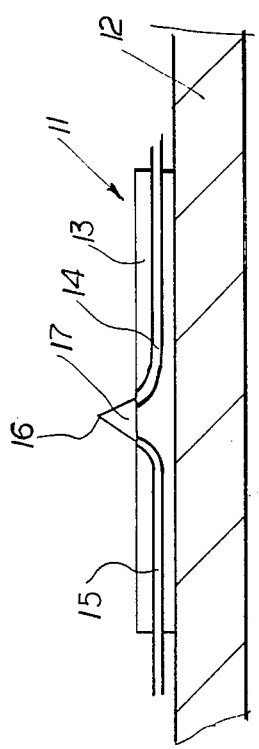
FIG. 2 is a side view of a sensor on a sectioned window pane.

FIG. 2 shows a sensor 11 which is placed on the inside of pane 12, preferably the windshield of a motor vehicle.

The sensor 11 has an electrically non-conducting carrier foil 13, wherein are inserted the electrically conducting wires 14, 15. The free ends 16 facing one another of the wires 14, 15 are bent towards the outside of the carrier foil 11 in such manner that they are exposed at the surface of the carrier foil 11 and lie flush therewith. A space 17 remains between the free ends 16 of the two wires 14, 15.

In the case that the interior surface of the carrier foil 11 is dry, a comparatively very high electrical resistance prevails between the free ends 16 of the inserted wires 14, 15. This resistance decreases to a considerable extent as soon as humidity deposits itself on the surface of carrier foil 4, since the humidity layer creates a practically conducting connection in the space 17 between the two free ends 16.

Figure 3:
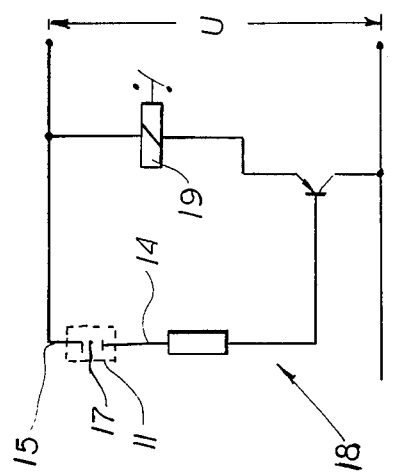
FIG. 3 is an electric circuit diagram for the sensor.

As is evident from FIG. 3, the sensor 11 is inserted into an electric circuit 18 for the purpose of measuring resistance.

As soon as the resistance between the free ends 16 of the two wires 14, 15 drops significantly, the switching element 19 of circuit 18 responds, so that further operating levers, controls etc. can be actuated, such as e.g. the actuation of an air conditioner, a blower, etc.

We claim:

1. In a ventilation system for a cab adapted to be occupied by a person and having a window, the improvement which comprises in combination:
   a filter comprising:
   a filter housing having an outlet,
   two multilayer filter packages disposed in said housing and converging toward said outlet to define a V configuration of said packages having an open side opposite a vertex of the V, and
   a blower in said housing adjacent said open side for drawing air into said housing from an inlet formed therein, and forcing said air outwardly through said filter packages from the interior of said V and then from said outlet, said filter packages each having:
   a first filter layer containing soda lime or sodium carbonate,
   a second filter layer containing expanded calcium-aluminum-silicate saturated with at least one $H_2S$-oxidizable substance, and
   a third filter layer containing active carbon;
   a condensate sensor on a surface of said window interiorly of the cab, said sensor comprising:
   an electrically nonconducting carrier foil having one face applied to said surface, and
   a pair of spaced apart wires received in said foil and having ends facing one another and angled to be inclined toward one another and terminating at an opposite face of said foil, whereby the formation of condensate on said opposite face reduces electrical resistance between said ends; and
   circuit means connected to said sensor and said blower and responsive to a reduction of said electrical resistance to activate said blower and induce air flow through said filter into said cabin.

2. The improvement defined in claim 1 wherein said circuit means is connected to an air conditioner which is turned on in response to a reduction of said electrical resistance representing the formation of condensation on said window.

3. The improvement defined in claim 1 wherein said wires consist of corrosion resistant material.

4. The improvement defined in claim 1 wherein said sensor is provided with means for effecting a color change from a green or blue through yellow to a red coloration depending upon the humidity sensed by said sensor.

* * * * *